United States Patent

[11] 3,624,469

[72] Inventor John E. Johanson
Boonton, N.J.
[21] Appl. No. 96,308
[22] Filed Dec. 9, 1970
[45] Patented Nov. 30, 1971
[73] Assignee Johanson Manufacturing Corporation
Boonton, N.J.

[54] ANTIBACKLASH SCREW-THREAD ADJUSTABLE ROTOR FOR LOW-LOSS CAPACITOR
5 Claims, 4 Drawing Figs.
[52] U.S. Cl. .................................................. 317/249 T, 317/251
[51] Int. Cl. .................................................. H01g 5/10
[50] Field of Search .......................................... 317/249 R, 249 T, 251

[56] References Cited
UNITED STATES PATENTS
3,512,059  5/1970  Johanson ........................ 317/251 X

*Primary Examiner*—E. A. Goldberg
*Attorney*—James J. Cannon

ABSTRACT: A low-loss capacitor having hollow cylindrical electrodes which are coaxially interleaved. The capacitance is varied by rotation of the rotor electrodes which are mounted on a screw member for axial displacement with respect to the stator electrodes when the screw member is turned. The screw member has a frictional-locking means in the form of a pair of diametrically opposed, outwardly bulging, thin-walled sections interspaced by through openings. A square opening is provided within the outer end of the screw member to permit adjustment thereof for tuning by use of a nonmetallic tuning rod tool of complemental square cross-sectional shape.

PATENTED NOV 30 1971

3,624,469

INVENTOR.
JOHN E. JOHANSON
BY James J. Cannon.

ATTORNEY.

ANTIBACKLASH SCREW-THREAD ADJUSTABLE ROTOR FOR LOW-LOSS CAPACITOR

This invention relates to adjustable capacitors and is directed particularly to improvements in friction lock adjustment screw mechanism for the rotors of such capacitors.

Applicant's U.S. Pat. No. 3,512,059, issued May 12, 1970, describes a rotatively adjustable low-loss capacitor having frictionally locked antibacklash adjustment screw mechanism. This invention is directed to improvements in such friction lock antibacklash capacitor adjuster mechanisms.

The principal object of this invention is to provide an improved friction lock antibacklash tuning adjustment mechanism for rotatively adjustable low-loss capacitors such as are used for tuning or as trimmers and which have maximum capacitances of the order of from 5 to 500 microfarads.

My invention is particularly well suited to use with electrical capacitors comprising a stator unit and a rotar unit each having a series of coaxially arranged, interspaced cylindrical electrode tubes. In such capacitors, the stator unit is rigidly connected by a hollow cylindrical insulating member with an interiorly threaded rotor bushing. The rotor unit comprises a rotor screw which engages the internal threads of the rotor bushing with a precision fit. One end of the rotor screw carries an axially displaceable group of rotor tubes which enter between and are spaced from the stator tubes. The outer end of the rotor screw is formed with interengagement means for adjustably turning the rotor unit with respect to the stator unit in tuning the capacitor. In such low-loss capacitors it is essential that the change in capacitance drift, whether due to change in ambient temperature or other causes, be kept to an absolute minimum. Because of its cylindrical structure such capacitors inherently have a low-temperature capacitance coefficient. It is, accordingly, another object of this invention to provide improved friction lock mechanism which will be antibacklash in nature and firm in its gripping action so as to minimize the possibility of capacitance drift, variation or change due to mechanical displacement of the rotor, once tuned, with respect to the stator, whether caused by vibration, shock forces, or changes in temperature.

A more particular object of the invention is to provide an antibacklash screw thread adjustable rotor for low-loss capacitors of the above nature wherein the rotor unit comprises a substantially tubular outer end portion the outer wall of which is formed with a pair of axially spaced screw thread sections interjoined by a relatively thin-walled tubular section which is resiliently deformable as radially outwardly extending bulges permitting helical misalignment of the two threaded portions upon insertion of the thus threaded rotor into the rotor bushing. The two threaded portions are thus yieldingly forced into helical alignment by an accompanying elongation of the outwardly bulging thin-walled intermediate portion to produce frictional engagement between the continuous internal threads of the rotor bushing and the interrupted external threads of the rotor screw. The thin-walled tubular section between the two screw thread sections is cut away at diametrically opposed portions thereof. The thickness of the interjoining thin-walled tubular section of the rotor unit and the peripheral extent of the diametrically opposed portions cut away is varied in accordance with the diameter of the rotor. The invention is particularly well suited to the manufacture of capacitors having smaller diameter rotor member units, usually those of lower capacitance values.

Still another object of the invention is to provide an antibacklash screw thread adjustable rotor for low-loss capacities where a square slot is provided at the outer end of the tunable rotor, such as can be formed by a swedging operation with special tooling, to permit use of a square-shaped rod tool of insulating material as a capacitance-adjusting device instead of the usual screwdriver. The use of a nonelectrically conductive material as a tuning tool is of particular importance in higher frequency applications. At the same time, making the rotor adjustment slot of square cross section provides for the greatest torque strength with the simplest fabrication. Another advantage of the square recess-adjustment slot comprising the invention is that it eliminates scraping of the internal threads of the rotor bushing caused by the standard metal screwdriver used in transversely slotted capacitor rotors heretofore known.

Other objects, features and advantages of the invention will be apparent from the following description when read with reference to the accompanying drawings. In the drawings, wherein like reference numerals denote corresponding parts throughout the several views.

Figure 1:
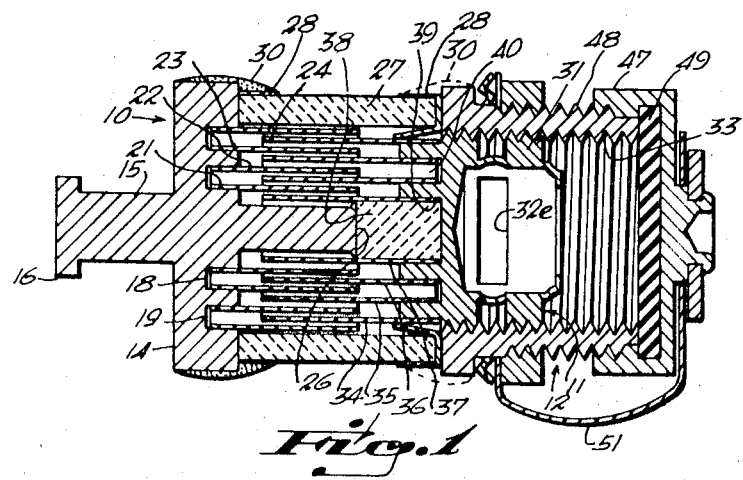
FIG. 1 is a side elevational view, in longitudinal cross section, of a capacitor embodying the invention.

Referring now in details to the drawings, the capacitor comprises a stator unit designated, generally, as 10 and a rotor unit 11. The rotor unit is threadedly mounted in a rotor bushing member designated, generally, as 12.

The stator unit 10 comprises a metal disc-shaped body portion 14 having an external, integrally formed axial extension 15. The free end of the extension 15 is headed, as indicated at 16, for retaining a conductor (not shown) prior to and during the formation of a soldered connection with the conductor. The conductor, or other circuit element connected to the extension 15, provides a utilization connection for energizing the stator unit 10.

The stator unit 10 has an inner annular groove 18 formed therein and an outer annular groove 19, the two grooves 18 and 19 being of rectangular cross section and precisely concentric with the common longitudinal axis of the stator unit 10 and the rotor bushing 12. Four stator tubes, 21, 22, 23 and 24 are precision fitted in the grooves 18 and 19 and are of equal lengths. The stator tubes 21-24 are permanently secured by the soldering. The stator tubes 21-24 are formed of invar or a similar alloy when a low-temperature coefficient of capacitance is desired. Where very low loss is important, the electrode tubes are made of silver or other material of low specific resistivity. An integrally formed cylindrical shank 26 extends from the body portion 14 of stator threaded sections 32a and 32b for the purpose hereinafter more particularly described.

The rotor unit 11 also comprises four rotor tubes 34, 35, 36, 37 of equal lengths formed of metal, as are the stator tubes 24, 25 described above. Inward movement of the rotor unit 11 is limited by a stop member 38 of insulating material suitably retained within the innermost rotor tube 37 and which abuts the shank 26 in the position of maximum capacitance. The innermost tube 34 is press fitted or otherwise permanently and accurately secured in place, being fitted against the lateral wall of a cylindrical recess 39 formed in the inner end of the rotor body 31. The intermediate tubes 35, 36 are similarly fitted against the inner and outer walls, respectively, of an annular groove 40 formed in the end of the rotor body 31, the depth of the groove 40 being the same as that of the recess 39. The outermost tube 37 is similarly fitted against a cylindrical outer end surface of the rotor body 31. For lower values of maximum capacitance, the member of rotor tubes may be reduced to a lesser number, or to a single tube for minimum capacitance.

Each of the four rotor tubes 34 through 37 extends to an adjustable extent within and overlies one of the four stator tubes 21 through 24 with substantially uniform radial spacing, the external surface of the stator shank 26 operating as an innermost stator electrode cooperating with the innermost stator tube 34.

Figure 4:
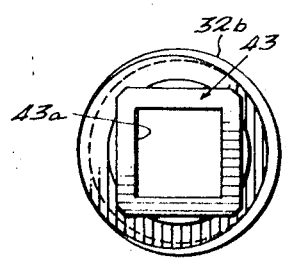
FIG. 4 is an outer end view of the rotor member as seen from the plane indicated at 4—4 of FIG. 2.

Means is provided for rotatively and axially adjusting the rotor unit 11 within the rotor bushes 12 for tuning or capacitance adjustment. To this end, the outer end of the metal body portion 31 of the rotor unit 11 is pressed into substantially square shape, as indicated at 43 in FIG. 4, as by a swedging operation, and provided with a comparatively large, substantially concentric square opening or slot 43a for the reception of a unit 10 coaxially within the innermost stator tube 21.

The stator unit 10 is rigidly connected to the rotor bushing 12 by a hollow cylindrical housing or sleeve 27 formed of a glazed ceramic material such as alumina. Glass is also suitable. At its ends, the external surface of the housing 27 is metallized to provide two thin circumferential bands 28 of metal intimately and positively adhered to the surface of the sleeve. In the drawings, the thickness of the metallized bands 28 has been exaggerated for clarity of illustration. The metallized bands 28 are connected to the periphery of the stator unit 10 and to the periphery of the rotor bushing 12 by rings of high melting point solder 30. During the soldering operation, the parts are so positioned that the longitudinal axes of the stator unit 10 and the rotor bushing 12 are precisely aligned.

The rotor unit 11 comprises a metal body portion 31 having two axially spaced series or groups of external helical threads 32a and 32b in threaded engagement with complementary internal thread 33 formed in the rotor bushing 12. The threads 32a and 32b constitute two axially spaced, threaded sections or groups of threads which are separated by a thin, tubular, nonthreaded section 32c of substantially reduced diameter. As a salient feature of this invention, diametrically opposed portions of the nonthreaded section 32c are cut away to provide an opposed pair of elongated openings 32d, 32e. The openings 32d, 32e in the nonthreaded section serve to reduce the compressional strength of said nonthreaded section, especially in small diameter rotary units, to more readily permit axial deformation thereof for the purpose hereinafter appearing. It is also to be noted that the nonthreaded section is deformed to provide opposed, outwardly bulging portions, as indicated at 32f and 32g. Such deformation of the rotor unit 11 results in relative axial displacement of the rodlike tool of square cross section to permit manual adjustment in the manner of a screwdriver. The provision of the comparatively large square-shaped tool slot permits the use of an adjustment tool, extruded, for example, of a tough synthetic plastic insulating material, instead of the usual metal screwdriver heretofore used. The use of a nonmetallic insulating material for the tuning or adjustment tool is of particular importance in high frequency applications where the proximity of metallic masses to the capacitor plates or tubes would effect a change in the absolute capacitance being tuned to. The use of a square tool opening moreover provides for the greatest torque strength in tuning with the simplest fabrication. The square slot also eliminates scraping of the internal threads of the rotor bushing, as was commonplace in rotors heretofore devised wherein screwdriver slots were provided for use with screwdrivers as the tuning tool.

The capacitor is shown provided with an end closure cap 47 threadedly engaging external threads 48 formed on the rotor bushing 12. An airtight seal is provided by a sealing disc 49 formed of resilient material. A retaining strap 51 formed of flexible material interconnects the cap 47 and the rotor bushing 12, so that the cap 47 will not become misplaced during its removal for capacitance adjustment.

Figure 2:
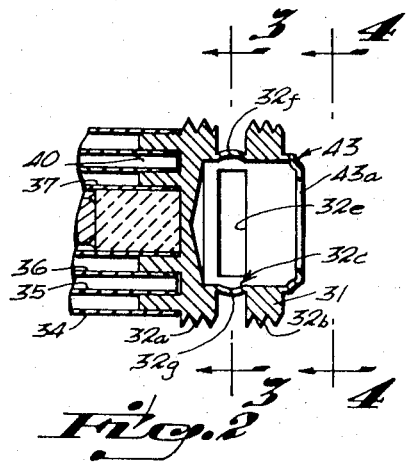
FIG. 2 is a partial view of the rotor member of the capacitor illustrated in FIG. 1, also shown in longitudinal cross section, and illustrating mechanical details of the antibacklash screw thread portion thereof.
Figure 3:
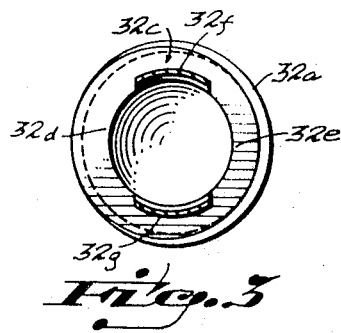
FIG. 3 is a vertical cross-sectional view taken along the line 3—3 of FIG. 2 in the direction of the arrows.

Referring to FIG. 2 it is to be noted that the non threaded section 32c of the rotor unit 11 will initially be of cylindrical shape. By means of a suitable spinning or forming operation, the thin-walled portion 32c is caused to assume the outwardly convex bulges 32f, 32g. The formation of the opposed bulges 32f, 32g brings the two series of threaded sections 32a and 32b axially closer together than they were at the time of their cutting as a single continuous thread. The threads 32a and 32b are thus resiliently helically misaligned. When threaded into the bushing 12, the thread sections 32a and 32b are thus axially forcibly urged apart by the internal threads 33 of the bushing 12 toward their initial spacing before the formation of said bulges. The bulges 32f, 32g are resiliently deformable, to a certain extent, toward the initial cylindrical configuration. Accordingly, the axially spaced threaded sections 32a and 32b are yieldingly urged toward each other by the bulges 32f and 32g and the resulting frictional force effectively locks the rotor body 31 in any desired position in the bushing 12 to which it is adjusted by means of a tool of square cross-sectional shape inserted in the square recess 34a as hereinabove described.

While I have illustrated and described herein only one form in which my invention can conveniently be embodied in practice, it is to be understood that this form is given by way of example only and not in a limiting sense. The invention, in brief, comprises all the embodiments and modifications coming within the scope and spirit of the following claims.

What I claim as new and desire to secure by Letters Patent is:

1. An adjustable capacitor comprising a rotor portion and a stator portion, relative axial displacement between said stator portion causing a variation in the capacitance of said capacitor; an interiorly threaded member mechanically connected to one of said capacitor portions and an exteriorly threaded member mechanically connected to the other capacitor portion, the threads of said interiorly threaded member being in cooperating engagement with the threads of said exteriorly threaded member for defining the axis of said axial displacement, said exteriorly threaded member having an axial bore and an annular groove formed therein, said groove defining, with said bore, a thin-walled portion of said exteriorly threaded member located intermediate two separate axially spaced threaded portions thereof, said thin-walled portion comprising a pair of diametrically opposed, resiliently deformable, outwardly bulging portions which yieldingly helically misalign said separate threaded portion when free from engagement with any cooperating threads, said threads being forcibly aligned by the threads of said interiorly threaded member when in engagement therewith to produce a continuous frictional engagement between said threaded members for resisting relative rotation therebetween, said bulging portion being interspaced by elongated through openings formed in said thin-walled portion.

2. An adjustable capacitor as defined in claim 1, wherein said bulging portions are of convex, radially outwardly extending configuration.

3. An adjustable capacitor as defined in claim 1, having an elongated exteriorly threaded adjustment screw having a uniform pitch throughout the threaded portion thereof, said screw having an axial bore and at least one annular groove formed therein which extends inwardly toward said bore, the threads of said screw being interrupted by said groove, said bore and said groove defining a thin-walled portion of said screw located intermediate axially spaced threaded portions thereof, said thin-walled portion comprising a pair of diametrically opposed, resiliently deformable, outwardly bulging portions which, with the threads of said screw free from any co operating threads, maintain said axially spaced portions of said screw threads, said spaced portions of said thread screw becoming yieldingly aligned by axial elongation of said screw accompanying simultaneous engagement of said spaced portions of said screw threads with cooperating internal threads, said elongation producing spring-pressed frictional engagement between said spaced portions of said screw threads and said cooperating threads.

4. An adjustable capacitor as defined in claim 3, wherein said bulging portions are of convex, radially outwardly extending configuration.

5. An adjustable capacitor as defined in claim 4, including a square recess formed in the outer end of said adjustment screw for interengagement with a manually operated adjustment tool.

* * * * *